United States Patent [19]

Taninaga et al.

[11] Patent Number: 5,711,697
[45] Date of Patent: Jan. 27, 1998

[54] ROBOT CONTROL SYSTEM

[75] Inventors: Tadashi Taninaga; Tetsuya Ogawa, both of Osaka, Japan

[73] Assignee: Komatsu Ltd., Tokyo, Japan

[21] Appl. No.: 737,604

[22] PCT Filed: Jun. 16, 1995

[86] PCT No.: PCT/JP95/01197

§ 371 Date: Nov. 25, 1996

§ 102(e) Date: Nov. 25, 1996

[87] PCT Pub. No.: WO95/35187

PCT Pub. Date: Dec. 28, 1995

[30] Foreign Application Priority Data

Jun. 17, 1994 [JP] Japan .................. 6-135999

[51] Int. Cl.$^6$ .................. B24B 49/00
[52] U.S. Cl. .................. 451/5; 451/11; 451/6; 451/9; 451/10; 901/41; 364/474.06; 318/560
[58] Field of Search .................. 451/5, 10, 11, 451/6, 9; 125/13.02; 364/474.06, 474.3; 901/41; 318/560, 568.18

[56] References Cited

U.S. PATENT DOCUMENTS

| | | | |
|---|---|---|---|
| 5,072,550 | 12/1991 | Matsumoto | 451/11 |
| 5,126,645 | 6/1992 | Yoshimi et al. | 901/41 |
| 5,299,389 | 4/1994 | Yonaha et al. | 451/5 |
| 5,315,789 | 5/1994 | Takashi | 364/474.06 |

FOREIGN PATENT DOCUMENTS

| | | | |
|---|---|---|---|
| 360135172 | 7/1985 | Japan | 451/11 |
| 60-244480 | 12/1985 | Japan . | |
| 2-170203 | 7/1990 | Japan . | |
| 3-60963 | 3/1991 | Japan . | |
| 3-142159 | 6/1991 | Japan . | |
| 4-101760 | 4/1992 | Japan . | |

Primary Examiner—Robert A. Rose
Assistant Examiner—George Nguyen
Attorney, Agent, or Firm—Nikaido Marmelstein Murray & Oram LLP

[57] ABSTRACT

When the amount of a change in load current supplied to a grinder is not more than a predetermined threshold value, the amount of piercing into a workpiece by the grinder is controlled according to the load current. When the amount of a change in load current exceeds the predetermined threshold value, the grinding speed of the grinder is controlled according to the load current. When performing a plurality of operations with one robot, a position correction value calculated in one operation is utilized to correct a target position in another operation.

2 Claims, 14 Drawing Sheets

ROBOT CONTROL SYSTEM

TECHNICAL FIELD

The present invention relates to robot control systems. More particularly, the present invention relates to a system for controlling a robot which carries a grinding tool to grind the surface of a workpiece and to a system for controlling a robot which uses a plurality of tools changing from one to another to perform sequential operations associated with the respective tools on one work-piece.

BACKGROUND ART

Industrial robots (hereinafter referred to as "robots") capable of carrying various kinds of tools for automatically performing associated operations such as welding, grinding, coating, parts assembly and inspection are well known and practically used. In the field of grinding, robots provided with a grinder are used in order to automatically carry out removal of excess weld metal, finish cutting of groove faces after gas-shearing or finish cutting of the surfaces of castings. However, such robots cannot overcome the problems of over-grinding and insufficient grinding because of the possibility of variations in workpiece configuration, workpiece position and the size of objects to be removed (e.g., flash) by grinding.

There have been proposed several automatic grinding systems provided with a robot for the purpose of solving the above draw-back and examples of such systems are disclosed in the following publications.

(1) Japanese Patent Laid-Open Publication No. 3-60963 (1991)

Profile grinding is performed with a grinder guided by the contour of a base metal, with the distance between the grinder and a workpiece being adjusted such that the load current for the motor for the grinder becomes constant.

(2) Japanese Patent Laid-Open Publication No. 3-142159 (1991)

A power sensor for detecting a reactive force transmitted from a workpiece is attached to the wrist of a robot. Based on information from the power sensor, the position and power of the robot are so adjusted that the pressing force exerted on the workpiece becomes constant. In addition, a set value for the pressing force is varied according to the difference between the present position and a target position.

Apart from the above-described robot systems, there are used other types of robot systems in which a single robot performs not only grinding but also a plurality of similar or the same operations on one workpiece, automatically changing tool hands according to an operation to be performed. Such systems are provided with adaptive control function for the purpose of carrying out desired operations which are impossible to cope with by the basic function (i.e., teaching playback) of the robot alone.

These prior art systems however suffer from their inherent problems. Specifically, the grinding system of the publication (1) performs grinding by the robot with constant pressing force so as to follow the contour of the base metal of a workpiece, and therefore, the shape (including flash etc.) of the object to be removed before grinding is reflected in the shape of the workpiece after grinding. This means that even though the unevenness of the workpiece can be relatively reduced, there will still remain unevenness after grinding. Such grinding systems are suited for simple polishing but unsuited for use in grinding which involves shaping operations such as removal of excess weld metal and finish cutting of castings.

The grinding system disclosed in the publication (2) needs to attach a power sensor to the wrist of the robot and therefore requires a separated processing unit for processing output data sent from the power sensor. This makes the whole system complicated.

In cases where a plurality of dissimilar operations are performed with one robot, if adaptive control is independently done for each operation, this requires different controllers for the respective operations, leading to the involvement of a large-scale control system. Furthermore, data obtained from the adaptive control for each operation needs to be individually kept in each controller, which is no more effective than the way wherein operations are separately, individually performed.

The invention has been made with a view to solving the foregoing problems and one of the objects of the invention is therefore to enable automatic grinding operation including shaping with high accuracy but without use of a complicated System, in order to grind the surface of a workpiece by use of a grinder loading robot. Another object of the invention is to make it possible to share data among a plurality of dissimilar operations which are performed with one robot, such data being concerned with each operation as well as adaptive control, so that data obtained from one operation can be utilized in other operations, which allows the whole operation to be very effective.

DISCLOSURE OF THE INVENTION

The first object is accomplished by a robot control system according to the invention for controlling a robot which carries a grinding tool to grind the surface of a workpiece, the control system comprising:

(a) load current detecting means for detecting a load current supplied to the grinding tool;

(b) load current change detecting means for detecting the amount of a change in the load current supplied to the grinding tool;

(c) piercing amount controlling means for controlling the amount of piercing into the workpiece by the grinding tool according to the load current detected by the load current detecting means;

(d) grinding speed controlling means for controlling the grinding speed of the grinding tool according to the load current detected by the load current detecting means; and (e) switching means for switching from the piercing amount controlling means to the grinding speed controlling means or vice versa such that when the amount of a change in the load current detected by the load current change detecting means is not more than a specified threshold value, the piercing amount controlling means executes its control and such that when the amount of a change in the load current detected by the load current change detecting means is more than the specified threshold value, the grinding speed controlling means executes its control.

In the invention having the first feature, when the amount of a change in the load current supplied to the grinding tool is not more than a specified threshold value, the piercing amount of the grinding tool with respect to the workpiece is controlled according to the load current. On the other hand, when the amount of a change in the load current exceeds the specified threshold value, the grinding speed of the grinding tool is controlled according to the load current. For parts which vary significantly in their configuration, the grinding speed of the grinding tool is accordingly controlled so that the parts can be shaped without leaving any areas unground. For parts which do not have much variation in their configuration, the piercing amount of the grinding tool is controlled so that finishing can be performed so as to follow the contour of the base metal of the parts. With this arrangement, large raised parts (e.g., weirs and gates) can be finished to smooth surfaces while being shaped. Thus, even if the configuration or position of a workpiece to be ground varies significantly, high-accuracy shaping into desired forms can be achieved without involving a complicated arrangement. Further, the control is based on load current, which makes it possible to directly monitor the state of grinding so that changes in the grinding performance of the grind stone can be immediately coped with.

In the invention, the piercing amount controlling means preferably performs its control such that when the load current is high, the piercing amount becomes small and when the load current is low, the piercing amount becomes large, and the grinding speed controlling means preferably performs its control such that when the load current is high, the grinding speed becomes low and when the load current is low, the grinding speed becomes high.

The second object is accomplished by a robot control system according to the invention for controlling a robot which uses a plurality of tools changing from one to another so that a series of operations associated with the respective tools can be performed on one workpiece, the control system comprising:

(a) target position memory means for storing a preliminarily taught target position for the robot;
(b) position adjusting means for adjusting the actual position of the robot so as to conform to an area in the workpiece on which an operation should be performed;
(c) correction value memory means for storing the difference between the target position stored in the target position memory means and the actual position adjusted by the position adjusting means as a position correction value during one operation; and
(d) correcting means for correcting a target position for the robot when performing another operation sequentially after said one operation, based on the position correction value which has been stored in the correction value memory means during said one operation.

According to the invention having the second feature, a first operation is performed, while the actual position of the robot being adjusted by the position adjusting means such as to conform to an area in the workpiece where operation is required to be performed. In the course of the first operation, the difference between the actual position of the robot and a preliminarily taught target position for the robot is stored as a position correction value in the correction value memory means. When performing a second operation sequentially after the first operation, the target position for the robot is corrected according to the position correction value which has been stored in the correction value memory means during the first operation. In this way, data is shared between the adaptive control in a plurality of operations and this enables it to perform control that is impossible to carry out by adaptive control in a single operation. In addition, such arrangement does not involve a large-scaled control system but makes it possible to sequentially perform a plurality of different operations with high efficiency, using one robot.

It is preferable that the tool used in the first operation be replaced with the tool to be used in the second operation by means of an automatic replacement apparatus. With this arrangement, a series of operations can be perfectly automated.

It will be appreciated that the first operation may be welding while the second operation may be grinding performed sequentially after the welding.

It is preferable that the target position memory means store a line segment connecting a weld starting point with a weld finishing point as the target position for the robot.

The position adjusting means preferably performs horizontal position control in which during weaving of a welding torch at the combining part of a weld joint, the difference between the value of welding current when the welding torch is at the right end and the value of welding current when the welding torch is at the left end is made to be zero, and performs vertical position control in which the difference between the value of welding current and a specified reference value is made to be zero.

Preferably, the correction value memory means stores, as the position correction value, the difference between the target position and the center line of weaving of the welding torch at the combining part of the weld joint.

Other objects of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

FIGS. 1 to 18 are associated with robot control systems according to preferred embodiments of the invention.

FIG. 1 is a system diagram showing a robot system for use in grinding operation according to a first embodiment of the invention.

FIG. 2 is a system diagram of a robot controller according to the first embodiment.

FIG. 3 is a flow chart of a basic program for the robot system according to the first embodiment.

FIG. 4 is a flow chart of a speed control executing routine.

FIG. 5 is a flow chart of a piercing control executing routine.

FIG. 7 is a system diagram showing a multiple-operation robot system according to a second embodiment.

FIG. 8 is a system diagram showing a robot controller according to the second embodiment.

FIG. 10 is a flow chart of a basic program for the multiple operation robot system according to the second embodiment.

FIG. 11 is a flow chart of a welding routine.

FIG. 12 is a flow chart of a grinding routine.

FIG. 13 is a flow chart of an ATC routine.

FIG. 15 is a perspective view showing welding operation.

FIG. 16 illustrates storing of a correction value during welding operation.

FIG. 18 illustrates a tool replacement operation.

BEST MODE FOR CARRYING OUT THE INVENTION

Referring now to the accompanying drawings, robot control systems according to preferred embodiments of the invention will be described.

(First Embodiment)

Figure 1:
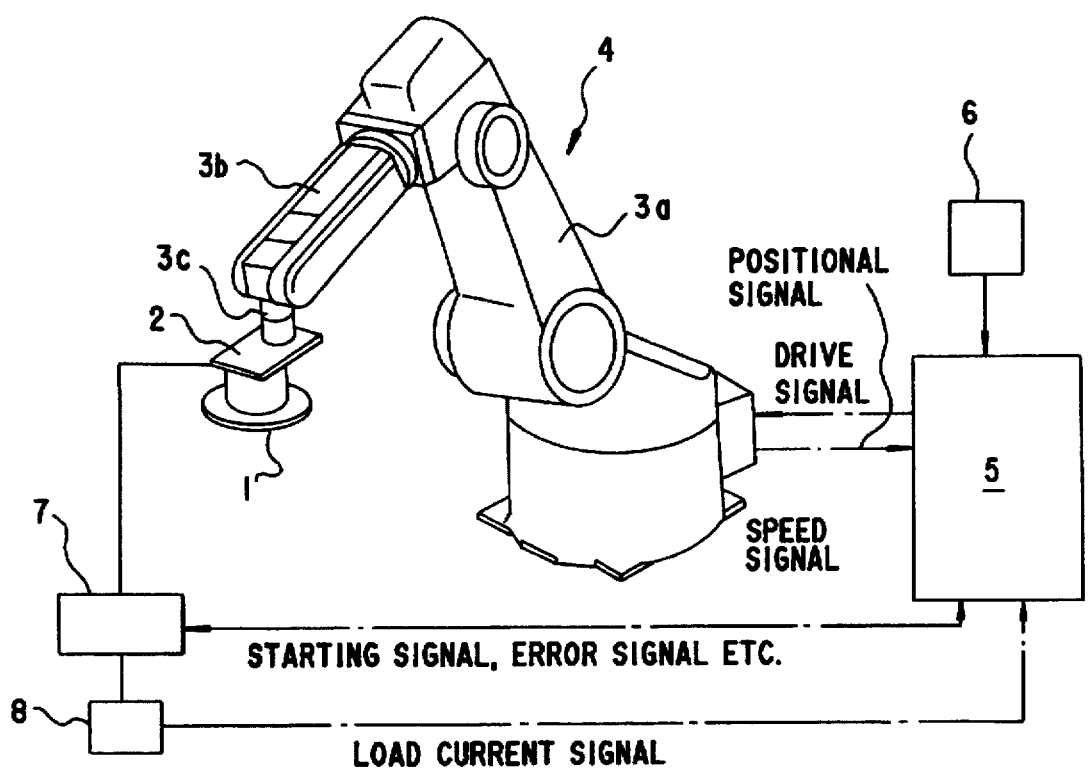

In this embodiment, the invention is applied to a robot system for use in grinding operation. As shown in FIG. 1, the robot system of the first embodiment includes (i) a grinder 2 having a grind stone 1 attached thereto so as to be rotatable at a specified rotational speed, (ii) an articulated robot 4 having a plurality of arms 3a, 3b and 3c which are moved at a specified speed in relation to the grinding surface of a workpiece, and (iii) a robot controller (robot driving control unit) 5 for performing the drive control of the robot 4 (more precisely, the rotation control of the grind stone 1, the position control and speed control of the arms 3a, 3b and 3c etc). Connected to the robot controller 5 is an operating device 6 which the operator handles for setting various conditions (teaching).

A motor (not shown) for driving the grinder 2 is powered by a power source 7 (hereinafter referred to as "grinder power source"). The load current for this motor is detected by a current sensor 8 and a load current signal from the current sensor 8 is input in the robot controller 5. Other signals to be input in the robot controller 5 include a positional signal which is representative of the present position of the robot 4 and sent from a position sensor (not shown) disposed in place in the robot 4 and a speed signal which is representative of the current speed of the robot 4 and sent from a speed sensor (not shown). According to the input data, the robot controller 5 performs a specified arithmetic operation to output a drive signal to the robot 4.

Figure 2:
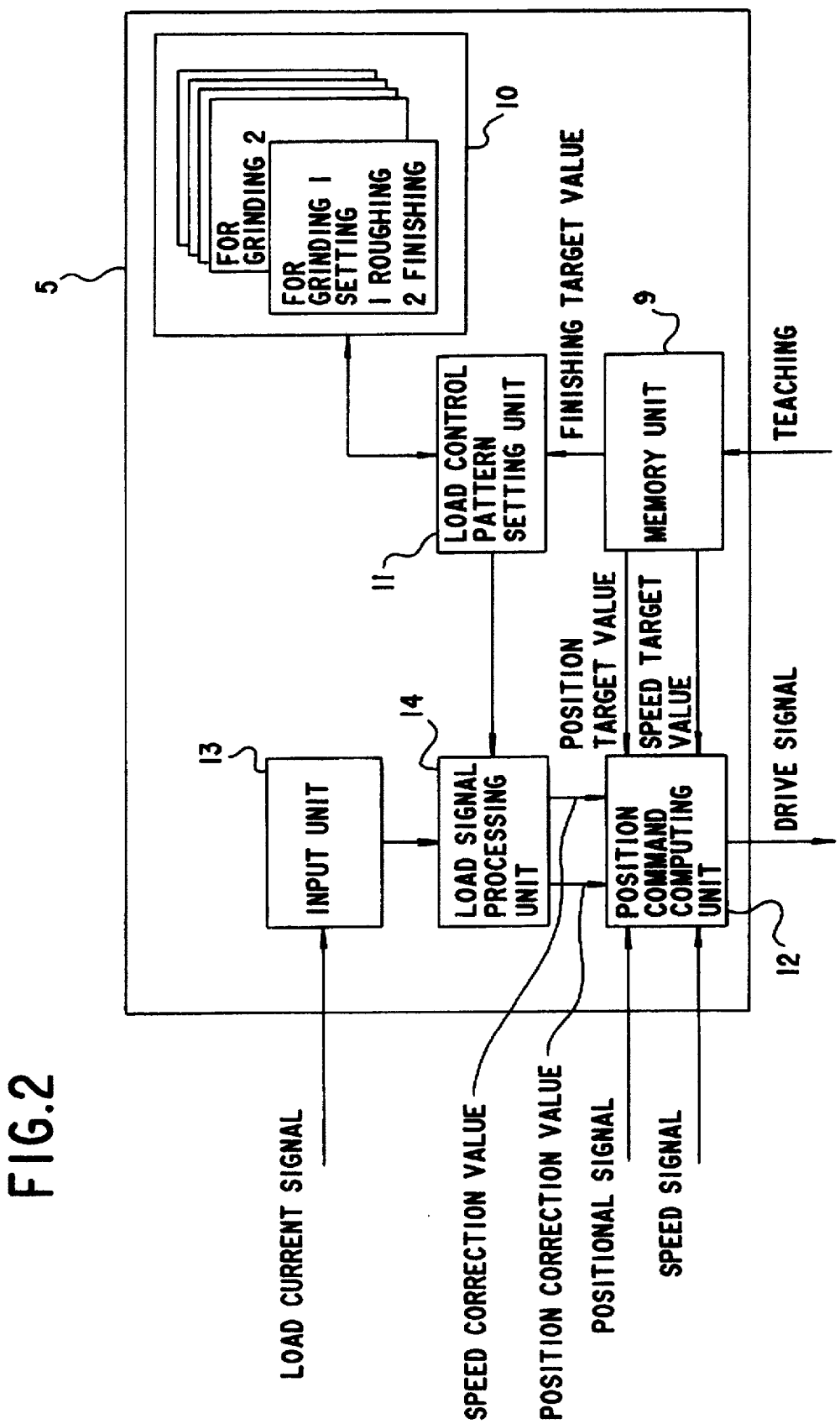

FIG. 2 concretely shows the structure of the robot controller 5 of this embodiment. As seen from FIG. 2, the robot controller 5 includes a memory unit 9 for storing working conditions such as the type of a tool to be used and desired finishing which have been set by the operator through the operating device 6. A load control pattern setting unit 11 inputs data sent from the memory unit 9 such as a target finishing value representing whether roughing or finishing is to be performed and inputs data prestored in a data base unit 10. In order to cope with various workpiece configurations and the uses of workpieces, a control pattern and set load values (a target current value, threshold value etc.) for every tool type and every finishing goal are preliminarily entered in the data base unit 10. Data related to a target position value and a target speed value, which have been stored in the memory unit 9 by teaching, are sent from the memory unit 9 to a position command computing unit 12.

A load current signal from the current sensor 8 is input in a load signal processing unit 14 through an input unit 13. The load signal processing unit 14 calculates a position correction value and a speed correction value based on the input load current signal and outputs these correction values to the position command computing unit 12. The position command computing unit 12 performs calculation to generate a drive signal based on the positional signal representative of the present position of the robot 4, the speed signal representative of the current speed of the robot 4, the target position value and target speed value input in the memory unit 9 and the position correction value and speed correction value input in the load signal processing unit 14. The drive signal computed by the unit 12 is output to the robot 4. It should be noted that signals such as a starting signal and error signal are transmitted between the robot controller 5 and the grinder power source 7.

Figure 3:
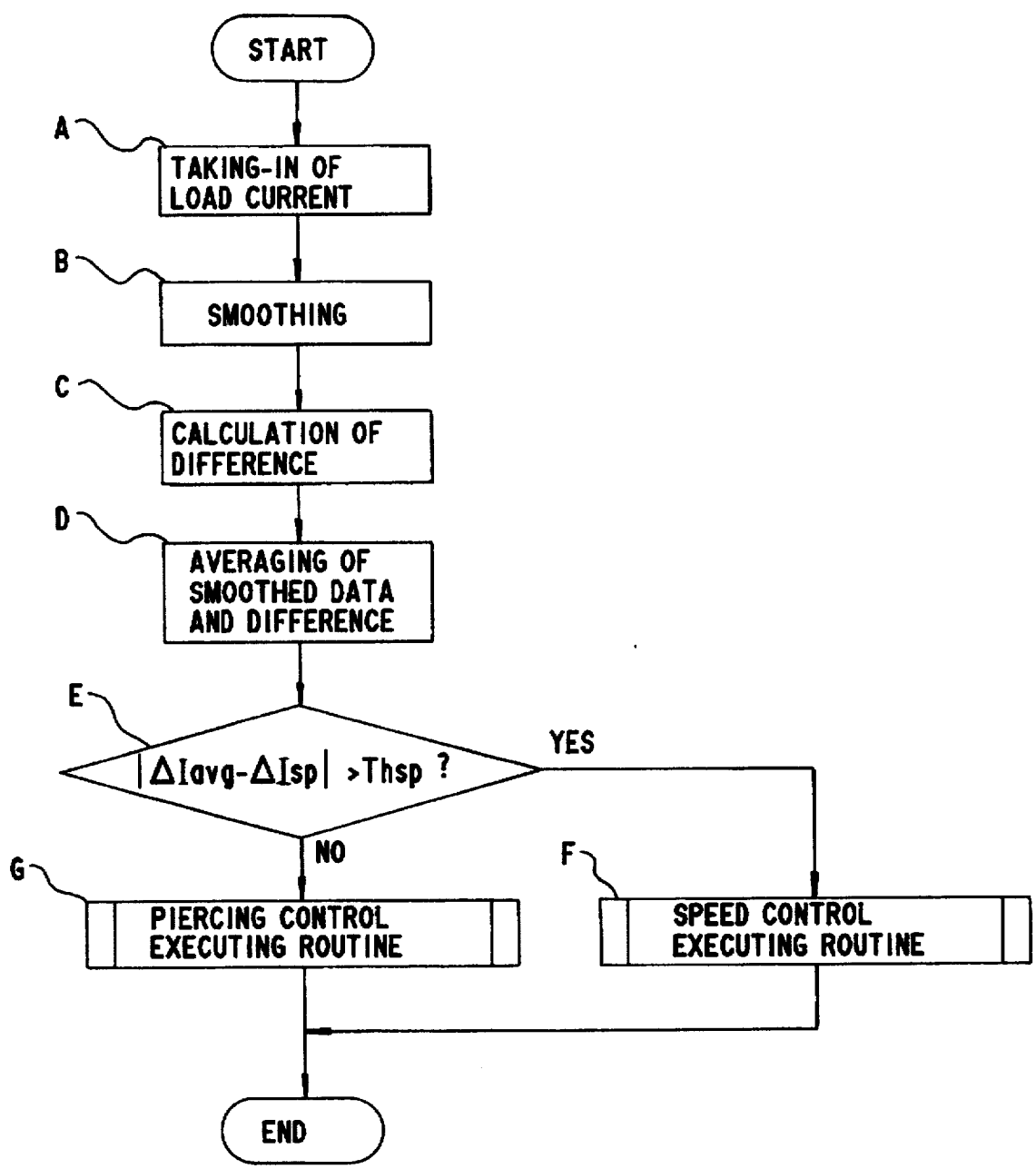

With reference to the flow chart of a basic program shown in FIG. 3, the adaptive control for the grinder 2 performed by the robot controller 5 of the above-described structure will be described in detail.

A to B: Data representative of the load current detected by the current sensor 8 is taken in, every specified sampling time. Using the following equation, smoothing is applied to n items of sampled data $I_{in}(i) \ldots I_{in}(n)$ which have been taken in.

$$I_{smt}(k)=[I_{in}(i)+ \ldots +I_{in}(n)]/n$$

C: A current difference value $\Delta I$ (m) is calculated from the sampled data (smoothed data) after smoothing, using the following equation.

$$\Delta I(m)=[I_{smt}(k)-I_{smt}(k-1)]/2$$

D: Smoothed data items $I_{smt}$ (k) and difference values $\Delta I(k)$, which are both obtained from k times of previous cycles, are respectively averaged using the following equations to obtain an average current $I_{avg}$ and an average current difference value $\Delta I_{avg}$.

$$I_{avg}=[I_{smt}(i)+ \ldots +I_{smt}(k)]/k$$

$$\Delta I_{avg}=[\Delta I(i)+ \ldots +\Delta I(k)]/k$$

E to G: If the absolute value of the difference between the present current difference value $\Delta I_{avg}$ and a target current difference value $\Delta I_{sp}$ for speed control exceeds a specified threshold $Th_{sp}$, in other words, if the time rate of change of load current is high, the flow proceeds to a speed control executing routine that will be described later with reference to FIG. 4. On the other hand, if the time rate of change of load current is low, the flow proceeds to a piercing control executing routine that will be described later with reference to FIG. 5.

Figure 4:
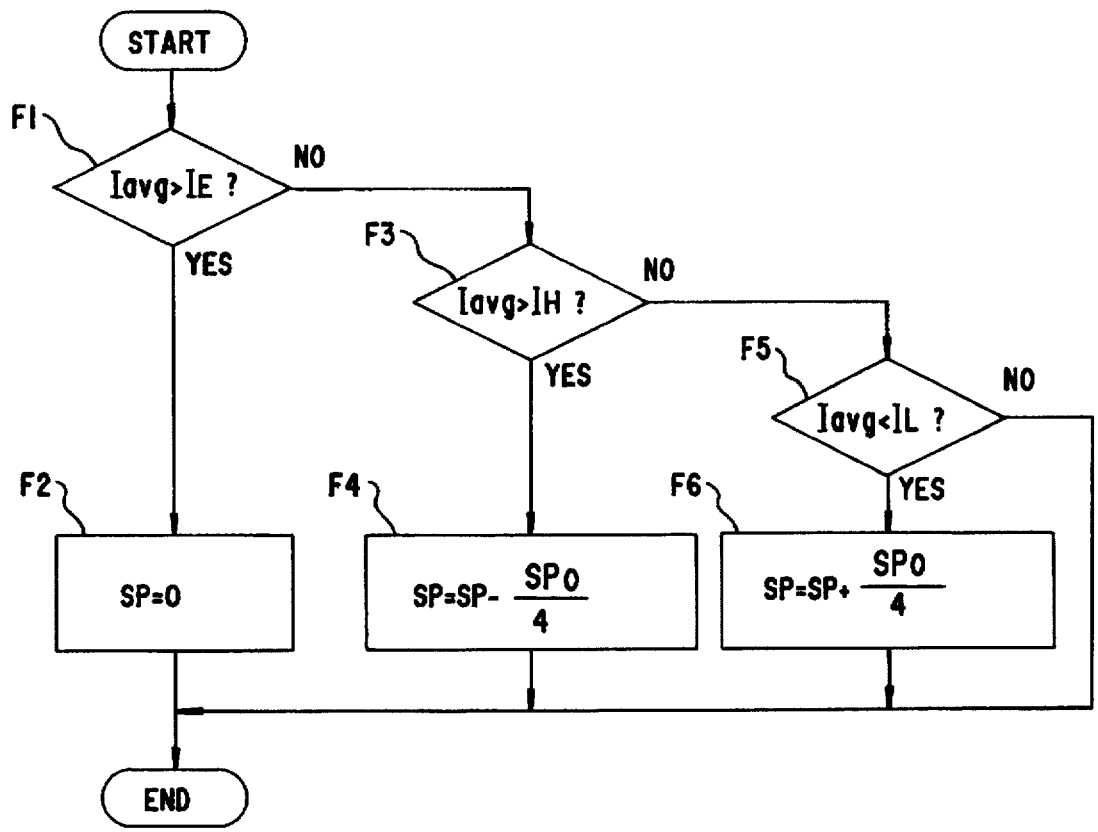

Next, reference is made to the flow chart of FIG. 4 to describe the aforementioned speed control executing routine (Steps F).

F1 to F2: If the average current $I_{avg}$ exceeds a preset maximum allowable load current $I_E$, grinding speed SP is set to zero.

F3 to F4: If the average current $I_{avg}$ is not more than the preset maximum allowable load current $I_E$ and exceeds an upper limit $I_L$ of a target current, the value obtained by deducting $SP_0/4$ ($SP_0$=initial grinding speed) from the present grinding speed SP is set as a new grinding speed SP.

F5 to F6: If the average current $I_{avg}$ is not more than the upper limit $I_H$ of the target current and below a lower limit $I_L$ of the target current, the value obtained by adding $SP_0/4$ to the present grinding speed SP (i.e., SP+$SP_0/4$) is set as a new grinding speed SP. If the average current $I_{avg}$ is not more than the upper limit $I_H$ of the target current and not less than the lower limit $I_L$ of the target current, the presently set grinding speed SP is used as it is.

Accordingly, in such a speed control executing routine, the grinding speed is so controlled that the load current exerted on the grinder 2 falls within the range between the upper limit $I_H$ and lower limit $I_L$ of the target current. With the control pattern of this speed control, the volume of removal from the workpiece per unit hour can be adjusted. Therefore, even if the sectional area of portions to be removed varies in the case of processing where importance is given to shaping such as when very rough parts are finished to flat surfaces, the workpiece can be ground according to teaching with no parts left unground.

Figure 5:
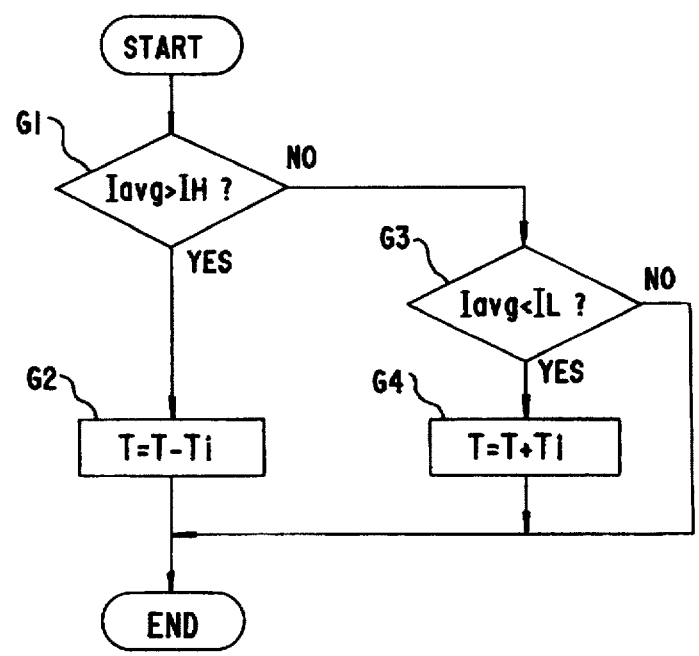

Next, reference is made to the flow chart of FIG. 5 to describe the aforementioned piercing control executing routine (Steps G).

G1 to G2: If the average current $I_{avg}$ exceeds the upper limit $I_H$ of the target current, the value (T−Ti) obtained by deducting a piercing correction value Ti from the present piercing amount T is set as a new piercing amount T.

G3 to G4: If the average current $I_{avg}$ is not more than the upper limit $I_H$ of the target current and less than the lower limit value $I_L$ of the target current, the value (T+Ti) obtained by adding the piercing correction value Ti to the present piercing amount T is set as a new piercing amount T. If the average current $I_{avg}$ is not more than the upper limit $I_H$ of the target current and not less than the lower limit $I_L$ of the target current, the presently set piercing amount T is used as it is.

Figure 6A:
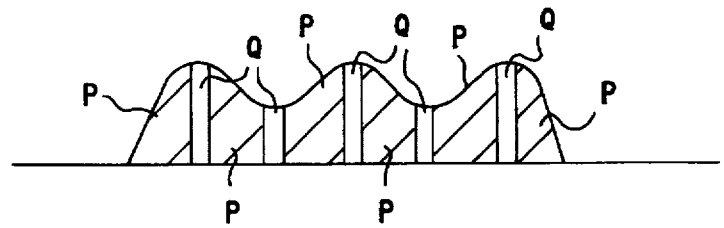
FIG. 6(a)–(c) are graphs showing examples of processing of a workpiece by use of the robot system according to the first embodiment.
Figure 6B:
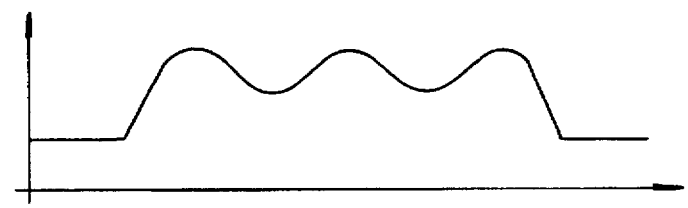
Figure 6C:
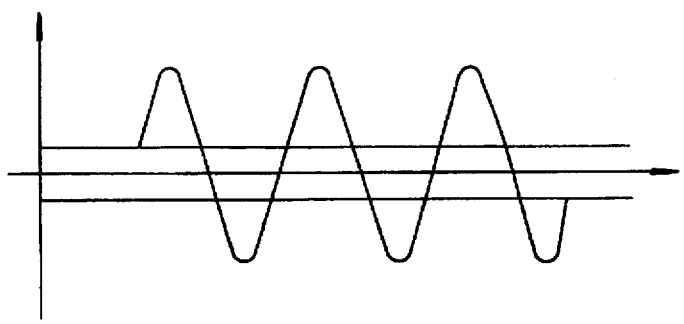

Accordingly, in such a piercing control executing routine, the amount of piercing can be controlled such that the load current exerted on the grinder 2 falls within the range between the upper limit $I_H$ and lower limit $I_H$ of the target current. It will be understood that the volume of removal from a workpiece per unit hour increases as the amount of piercing increases provided that the speed of the grinder 2 is constant. Therefore, the control pattern of the piercing control described above is particularly useful for processing in which smooth finishing performed so as to follow the contour of a base metal is desired, because it is possible to adjust the amount of piercing so as to make the load current exerted on the grinder 2 constant thereby making the volume of removal constant.

Where a workpiece having a sectional configuration as shown in FIG. 6(a) is ground by use of the above robot system for example, the value of the load current detected by the current sensor 8 and the current difference value are represented by the curves shown in FIGS. 6(b) and 6(c) respectively. If the control of the first embodiment is applied to such a workpiece, the speed control is executed in the regions marked with P and the piercing control is executed in the regions marked with Q in FIG. 6(a). As a result, shaping can be performed leaving no parts unground in the areas having significant variations in configuration whereas finishing can be performed so as to follow the contour of the base metal in the areas having minor variations in configuration. Accordingly, even if the workpiece to be ground has large raised parts like the weirs or gates of castings, the workpiece can be finished to smooth surfaces while being shaped.

While the first embodiment has been described with a case where the speed control and the piercing control are automatically switched according to whether the amount of a change in the load current applied to the grinder 2 is large or small, the robot system of the invention is also applicable to a case where processing in which importance is given to shaping (e.g., when finishing is performed after roughing) and processing in which importance is given to smooth finishing are separately performed in different procedures.

(Second Embodiment)

In this embodiment, the invention is applied to a multiple-operation robot system which performs welding operation using a welding torch as a working tool and then performs grinding operation sequentially after the welding operation, replacing the welding torch with a grinder.

Figure 7:
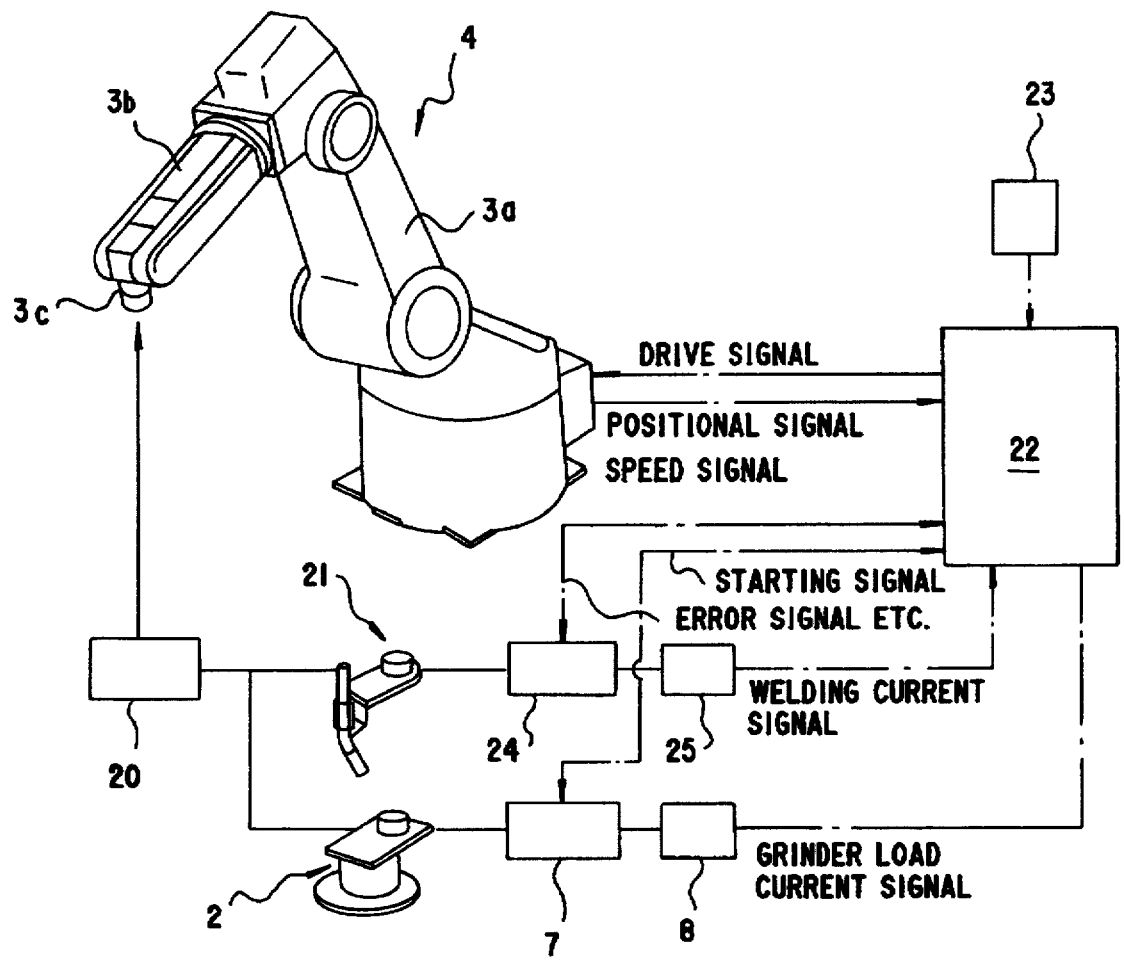

It is understood from FIG. 7 that the robot 4 having a plurality of arms 3a, 3b and 3c in the multiple-operation robot system of the second embodiment does not differ basically in the main body structure from the robot of the first embodiment. In the second embodiment, an automatic tool changer 20 is employed to automatically change working tools from a welding torch 21 to the grinder 2. There is also provided a robot controller 22 which executes the adaptive control of the grinder 2 as described in the first embodiment and the adaptive control of the welding torch 21 to be described later. This robot controller 22 is connected to an operating device 23 through which the operator sets (teaches) various conditions.

A motor (not shown) for driving the grinder 2 is powered by the grinder power source 7. The load current of the motor is detected by the current sensor 8 which in turn issues a grinder load current signal to the robot controller 22. The welding torch 21 is provided with welding current supplied from a welding power source 24. The welding current supplied from the welding power source 24 is detected by a current sensor 25 which in turn issues a welding current signal to the robot controller 22. Like the first embodiment, the robot controller 22 inputs a positional signal which represents the present position of the robot 4 and is sent from a position sensor (not shown) disposed in place on the robot 4 and a speed signal which represents the current speed of the robot 4 and is sent from a speed sensor (not shown). Based on these input signals, the robot controller 22 performs specified arithmetic operation and outputs a drive signal to the robot 4. It should be noted that signals such as a starting signal and error signal are transmitted between the robot controller 22 and the grinder power source 7 and between the robot controller 22 and the welding power source 24.

Figure 8:
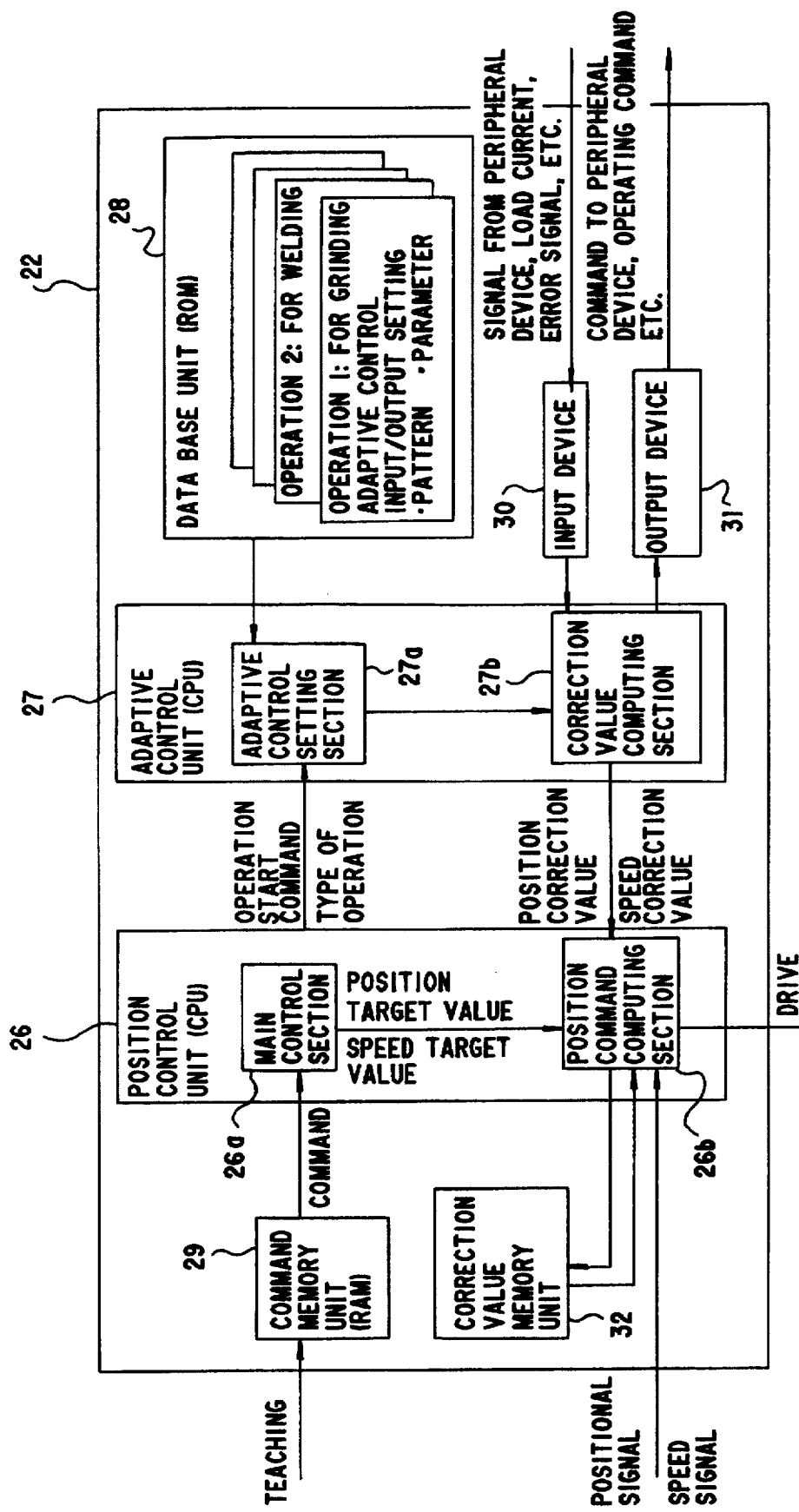

FIG. 8 concretely shows the structure of the robot controller 22 of the second embodiment. As seen from FIG. 8, the robot controller 22 includes a position control unit 26 for controlling the basic position and speed of the robot 4; an adaptive control unit 27 for executing adaptive control according to the type of an operation to be performed; and a data base unit 28 in which a control pattern, parameters and input/output setting for adaptive control for each type of operation (each tool) are entered.

Commands for instructing the position and speed of the robot 4 which are set for every step by the operator through the operating device 23 according to the operation to be performed are once stored in a command memory unit 29 incorporated in the robot controller 22 and analyzed by a main control section 26a of the position control unit 26. When there arises a need for the adaptive control corresponding to the operation to be performed, the main control unit 26a sends an operation start command and information on the type of the operation to be performed to an adaptive control setting section 27a of the adaptive control unit 27. Upon receipt of the operation start command, the adaptive control setting section 27a sets an adaptive control pattern and parameters which correspond to the operation to be performed, reading them from the data base unit 28 and also executes input/output setting. After completion of the setting in the adaptive control setting section 27a, a correction value computing section 27b of the adaptive control unit 27 sequentially computes a position correction value and a speed correction value from a grinder load current signal or welding current signal which has been received through an input device 30. These computed values are output to a position command computing section 26b of the position control unit 26 and output to periphery devices through an output device 31. In the position command computing section 26b, a drive signal is computed based on a position signal representative of the present position of the robot 4, a speed signal representative of the present speed of the robot 4, a position target value and speed target value which have been input from the main control section 26a, and a position correction value and speed correction value which have been input from the correction value computing section 27b. The computed drive signal is output to the robot 4. The position correction value and speed correction value are stored in a correction value memory unit 32 and read from the correction value memory unit 32 as required in the calculation to generate the drive signal.

The details of the adaptive control for the grinder 2 have been already described in the first embodiment. In the adaptive control for the welding torch 21, two kinds of control i.e., horizontal position (the position with respect to a direction transverse to the traveling direction of the torch 21) control and vertical position (level) control are performed simultaneously in the following manner.

Figure 9A:
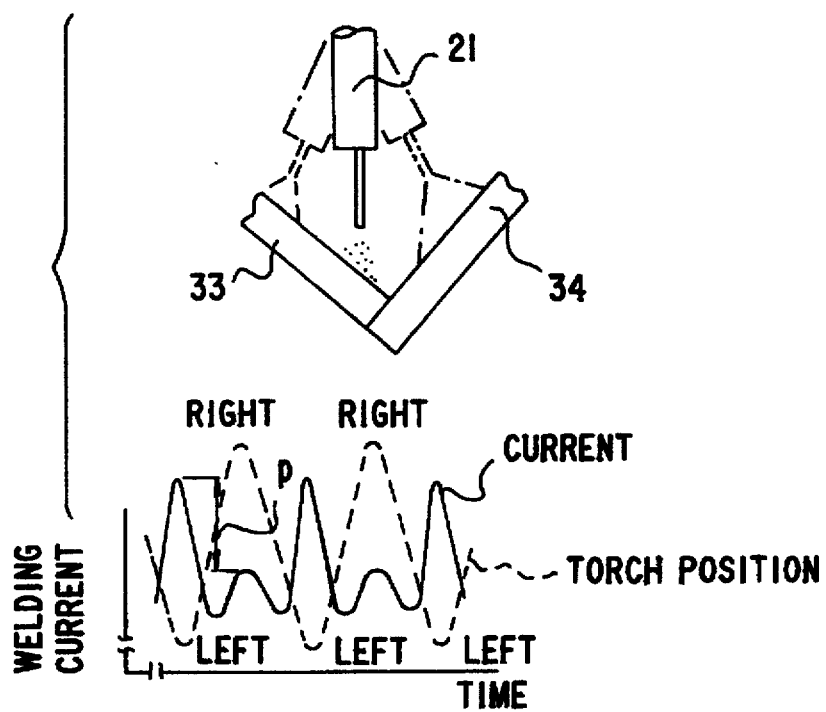
FIGS. 9(a) through (c) are horizontal positions control for a welding torch.
Figure 9B:
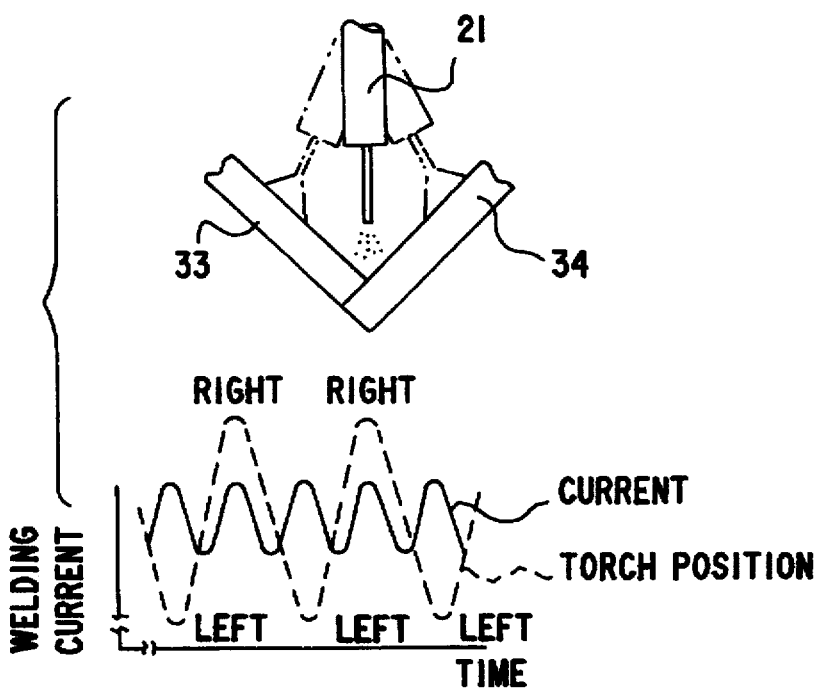
Figure 9C:
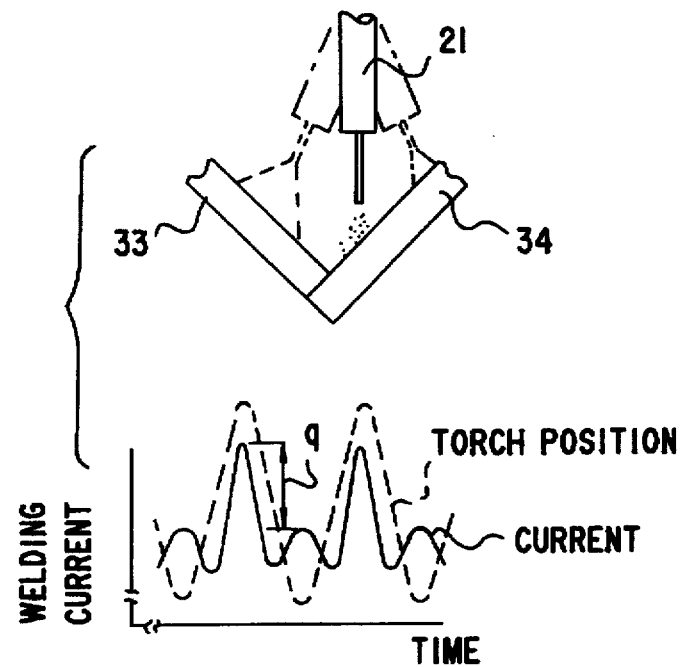

In the horizontal position control, when the welding torch 21 is moved along the joint of materials to be welded 33, 34, a weaving motion is imparted to the welding torch 21 so as to laterally weave in a sinusoidal manner, and the horizontal position of the welding torch 21 is adjusted such that the difference between the welding current (arc current) when the welding torch 21 is at the right end and the welding current when the welding torch 21 is at the left end becomes zero, these currents being detected by the current sensor 25 during the weaving movement. FIG. 9(a) shows the state in which the welding torch 21 is offset to the left so that the peak value of welding current when the torch 21 is at the left end is greater than the peak value of welding current at the right end by the difference p. FIG. 9(c) shows the state in which the welding torch 21 is offset to the right with the peak value of welding current when the torch 21 is at the right end being greater than the peak value of welding current at the left end by the difference q. Thus, when there occurs a difference between the peak values of welding current when the welding torch 21 is at the right end and when it is at left end, the position control of the welding torch 21 is executed to make the difference be zero as shown in FIG. 9(b).

In the vertical position control, the low frequency components of welding current are taken out thereby to detect the average vertical position (average level) of the welding torch 21. This average position is compared with a preset reference value and the vertical position of the welding torch 21 is adjusted such that the difference between the average position and the reference value becomes zero.

In the multiple operation robot system of the second embodiment, the adaptive control for the welding torch is switched to the adaptive control for the grinder, these adaptive control being mainly intended to automatically correct the displacement of a tool from a position taught by the operator, and the correction values stored in the correction value memory unit 32 during the adaptive control for the welding torch 21 are utilized in the adaptive control for the grinder 2. This enables it to correct the displacement of the grinder 2 in a direction perpendicular to the grinding line on the grinding plane, which is generally uncorrectable by the adaptive control for the grinder 2.

Next, reference is made to the flow charts of FIGS. 10 to 14 to describe the details of the control performed when grinding is carried out sequentially after welding.

Figure 10:
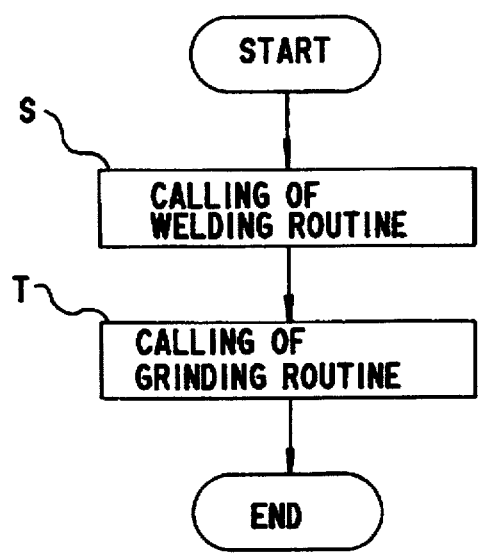

FIG. 10 is a flow chart of a basic program. In this basic program, a welding routine is first called (Step S) and then a grinding routine is called (Step T).

Figure 11:
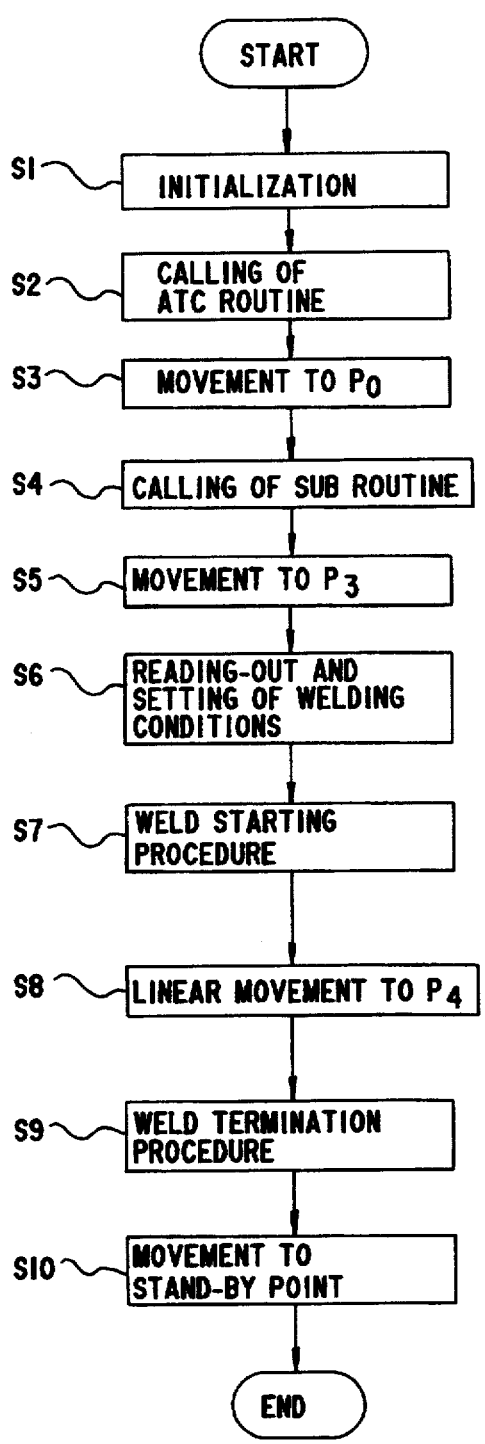

The welding routine is executed according to the flow chart of FIG. 11.

S1: Initialization is executed. In this initialization, a tool request signal is set to 1 (which represents the welding torch) while tool parameters corresponding to the welding torch are read from a tool parameter table in order to set them. Then, the control point is shifted to the point indicated by the tool parameters. It should be noted that the tool parameters are the values of the length, angle and other factors of a tool, which are represented by points in a coordinate system fixed on a six-axes flange face of the robot 4.

Figure 13:
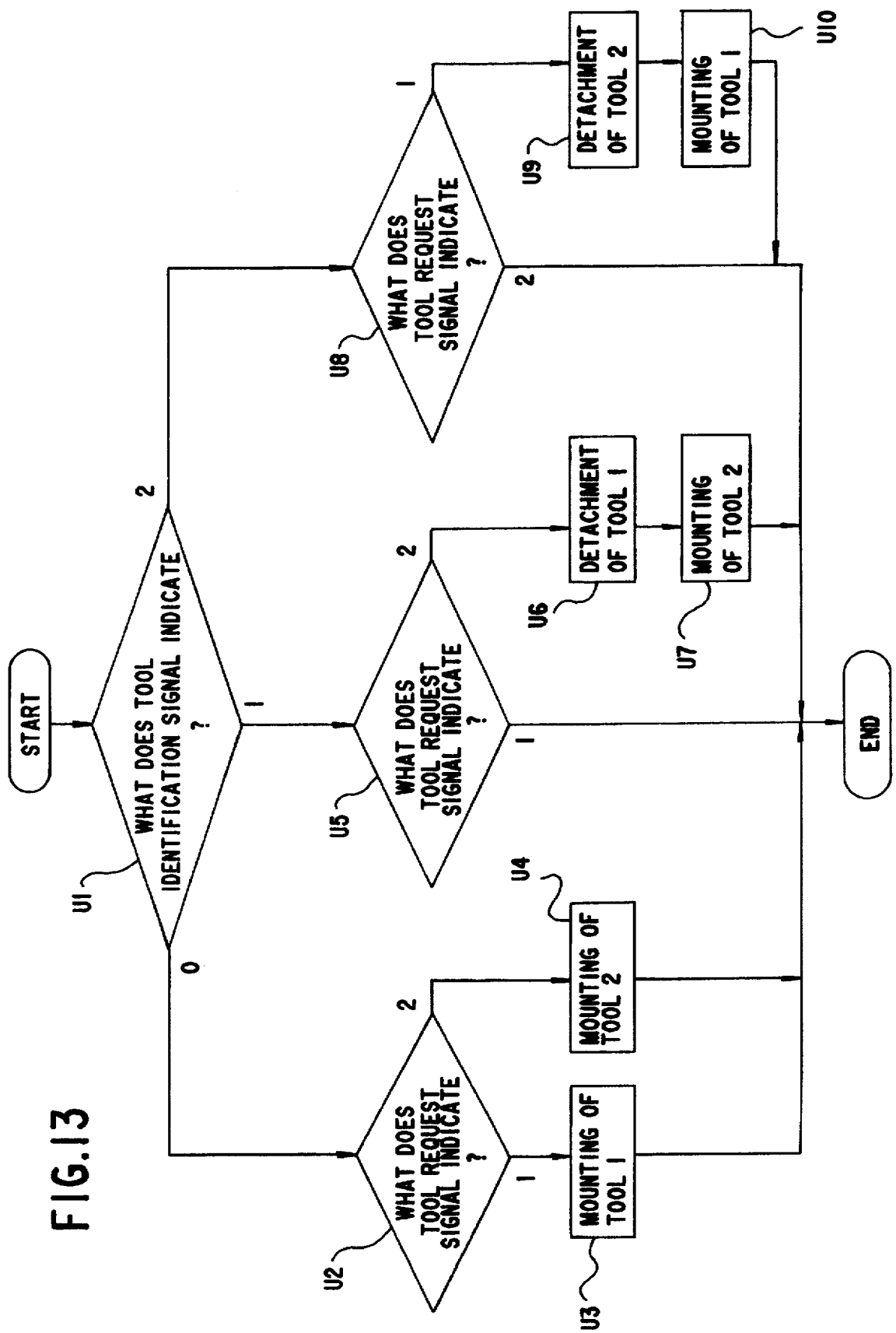
Figure 15:
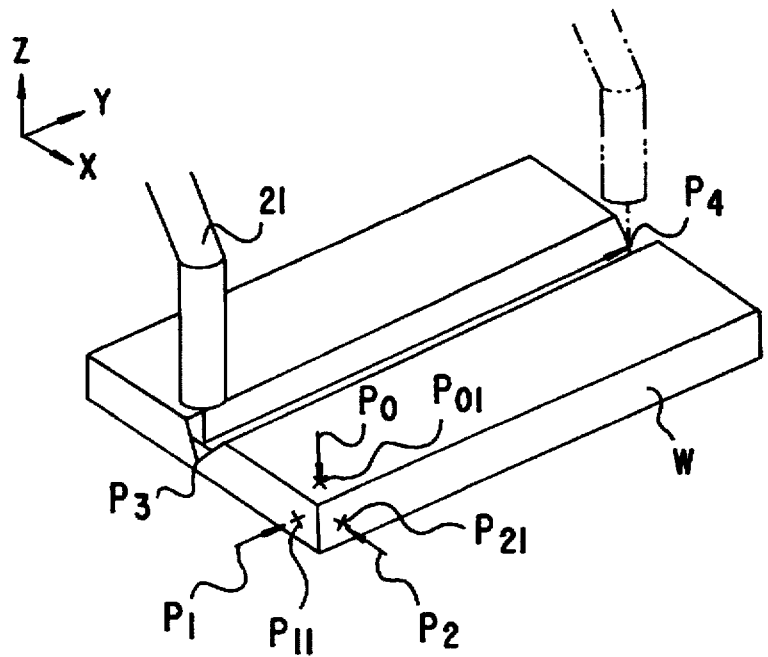

S2 to S4: An ATC routine that will be described later with reference to the flow chart of FIG. 13 is called and the welding torch 21 is mounted on the robot 4. The robot 4 is then moved to a search starting point $P_0$ (the position of the workpiece with respect to the z-direction, which has been taught by the operator before-hand). Thereafter, a search routine for correcting the displacement of a weld starting point is called. It should be noted that in this search routine, the end face positions $P_0$ (z-direction), $P_1$ (y-direction) and $P_2$ (x-direction) of the workpiece W taught by the operator are set as search starting points (see FIG. 15) and with these search starting points, searching operation is performed in a preliminarily taught direction in order to obtain the present position $(P_{01}, P_{11}, P_{21})$ of the workpiece W represented by the base coordinate system for the robot 4. The search operation is performed for example in such a manner that the welding torch 21 is moved toward the workpiece W while the conductive state of the welding torch 21 being monitored and that the movement of the welding torch 21 is stopped when it is in a conductive state. In this way, the difference between the present position of the workpiece W and the taught position of the workpiece W is obtained and with this difference, the displacement of the weld starting point $P_3$ can be corrected by the following equations. Note that the value of the weld starting point after correction is denoted by $P_{3new}$ and the value of the same before correction is denoted by $P_{3old}$.

$$P_{3new,x} = P_{3old,x} + (P_{21,x} - P_{2,x})$$

$$P_{3new,y} = P_{3old,y} + (P_{11,y} - P_{1,y})$$

$$P_{3new,z} = P_{3old,z} + (P_{01,z} - P_{0,z})$$

S5 to S6: The welding torch 21 is moved to the weld starting point $P_3$ and welding conditions are read from the data base section 28. Then, an instruction for the welding power source 24 and the corresponding adaptive control are set.

Figure 16:
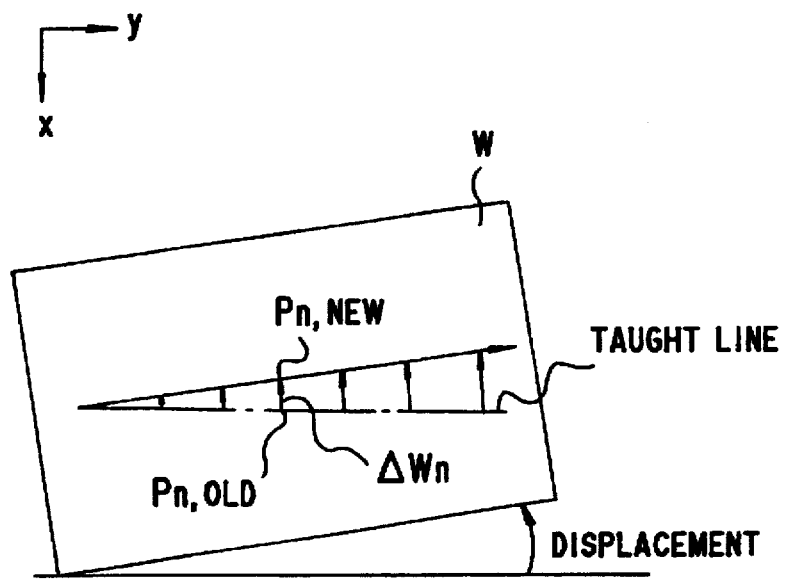

S7: A weld starting procedure is taken. More precisely, instructions on current and voltage as well as a start command are sent to the welding power source 24 while the adaptive control is initiated by the adaptive control unit 27. In this adaptive control, the correction value computing section 27b calculates a correction value for the position with respect to the x-direction (horizontal direction) in the same way as described earlier (a correction value for the position with respect to the z-direction (vertical direction) can be also calculated likewise). The correction value is sent to the position command computing section 26b which in turn converts the correction value into coordinates in the base coordinate system of the robot 4 to add to a present target value so that a new target value can be obtained. Further, the difference $(\Delta W_n = P_{n,new} - P_{n,old})$ between the target value $P_{n,new}$ incorporating the correction value and the target value $P_{n,old}$ taught by the operator for the present processing cycle is stored (see FIG. 16). Note that the difference value $\Delta W_n$ is an integrated correction value represented by the robot base coordinate system. Then, the difference $(\Delta P_n = \Delta W_n - \Delta W_{n-1})$ between the difference value $\Delta W_n$ and the difference value $\Delta W_{n-1}$ in the preceding processing cycle is stored in the correction value memory unit 32. Note that the difference value $\Delta P_n$ is the difference between the integrated value up to the preceding cycle and the integrated value up to the present cycle.

S8 to S10: While the adaptive control and the storage of the correction value being executed, the welding torch 21 is linearly moved to a welding end point $P_4$. After the welding torch 21 has reached the welding end point $P_4$, a weld termination procedure is taken. More specifically, a termination command is issued to the welding power source 24 and the adaptive control is stopped. After that, the welding torch 21 is moved to a preliminarily taught stand-by point to complete the welding routine.

Figure 12:
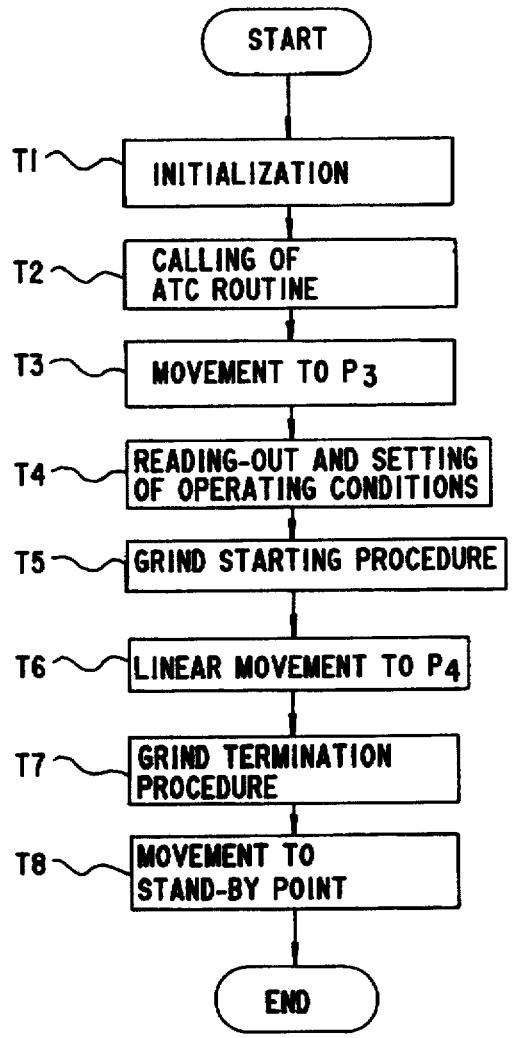

Then, the grinding routine is executed according to the flow chart of FIG. 12.

T1: Initialization is executed. This initialization is similar to the initialization in the welding routine. Specifically, the tool request signal is set to 2 (which represents a grinder) and tool parameters corresponding to a grinder are read from the tool parameter table to set them. Thereafter, the control point is shifted to the point indicated by these tool parameters.

T2 to T4: The ATC routine to be described later with reference to the flow chart of FIG. 13 is called while the welding torch 21 is detached and the grinder 2 is mounted. Then, the robot 4 is moved to the starting point $P_3$ (grind starting point) on which a correction has been made in the welding routine. After grinding conditions are read from the data base unit 28, the value of a command for the grinder power source 7 and the corresponding adaptive control are set.

T5: A grind starting procedure is taken, in which an operation starting command is sent to the grinder power source 7 and the adaptive control unit 27 starts the corresponding adaptive control. In this adaptive control, the correction value computing section 27b calculates a correction value for the z-direction based on a load current signal from the current sensor 8 and this calculated correction value is sent to the position command computing section 26b, as described earlier in the first embodiment. For regeneration of the stored data, the position command computing section 26b reads the correction value $\Delta P_n$ which has been stored in the correction value memory unit 32 during the adaptive control of the welding torch 21. Then, this correction value $\Delta P_n$ is added to a target value $P_{n,old}$ taught by the operator, so that a new target value $P_{n,new}$ can be obtained. In the meantime, the correction value computing section 27b calculates a correction value $\Delta G_n$ and converts it into coordinates on the robot base coordinate system to add to the target value $P_{n,new}$ calculated in this operation, so that a real target value $P_{n,real}$ can be obtained.

Figure 17A:
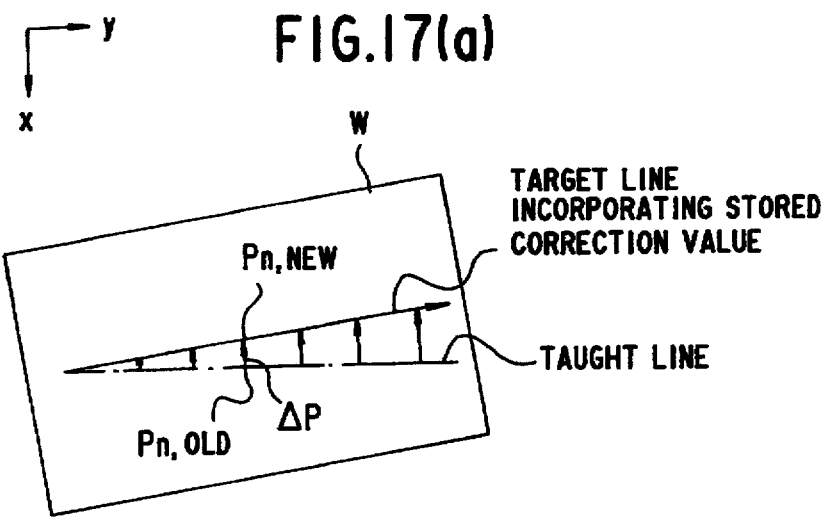
FIGS. 17(a) and (b) illustrate retrieval of a stored correction value during grinding operation.

FIG. 17 shows one example of the calculating procedure for obtaining the real target value $P_{n,real}$ in the adaptive control of the grinder 2. The example shown in FIG. 17 is a case where only the correction value $\Delta P_n$ for the x-direction is stored during the adaptive control of the welding torch 21 and a correction is made to only the position with respect to the z-direction during the adaptive control of the grinder 2. As illustrated in FIG. 17(a), the target value $P_{n,new}$ incorporating the stored correction value is obtained from the target value $P_{n,old}$ in the taught data, using the following equation.

$$P_{n,new}=P_{n,old}+\Delta P$$

$\Delta P$: stored integrated correction value

Figure 17B:
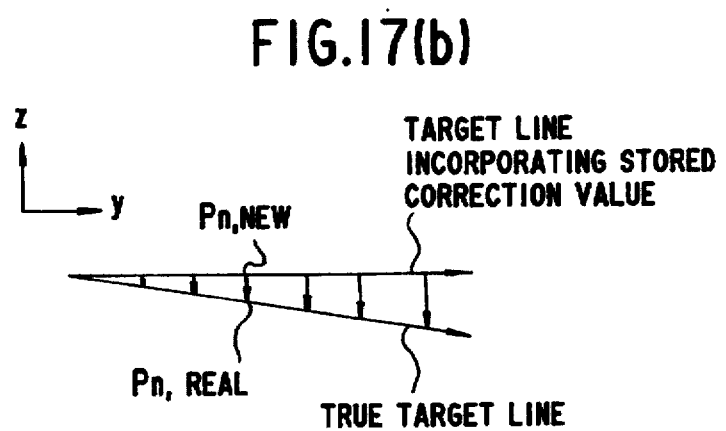

Then, the correction value $\Delta G_n$ obtained in the adaptive control of the grinder is added to the target value $P_{n,new}$ obtained from the above equation as shown in FIG. 17(b) so that a real target value $P_{n,real}$ can be obtained. This is described by the following equation.

$$P_{n,real}=P_{n,new}+\Delta G_n$$

T6 to T8: While performing the adaptive control and the regeneration of the correction value, the grinder 2 is linearly moved to a grinding end point $P_4$. After the grinder 2 has reached the end point $P_4$, a grind termination procedure is taken, in which a termination command is issued to the grinder 2 and the adaptive control is stopped. After that, the grinder 2 is moved to a preliminarily taught stand-by point thereby to complete the grinding routine.

The procedure of the ATC routine (Step S2 in FIG. 11 and Step T2 in FIG. 12) will be described below, with reference to the flow chart of FIG. 13.

U1 to U4: When a tool identification signal for informing a presently mounted tool indicates 0 (nothing), if the tool request signal indicates 1 (welding torch), the tool 1 (welding torch) is mounted, and if the tool request signal indicates 2 (grinder), the tool 2 (grinder) is mounted.

U5 to U7: When the tool identification signal indicates 1 (welding torch), if the tool request signal indicates 1 (welding torch), tool replacement is unnecessary so that the flow is ended as it is, and if the tool request signal indicates 2 (grinder), the presently mounted tool 1 (welding torch) is detached and the tool 2 (grinder) is mounted.

U8 to U10: When a tool identification signal indicates 2 (grinder), if the tool request signal indicates 2 (grinder), tool replacement is unnecessary so that the flow is ended as it is, and if the tool request signal indicates 1 (welding torch), the presently mounted tool 2 (grinder) is detached and the tool 1 (welding torch) is mounted.

Figure 14A:
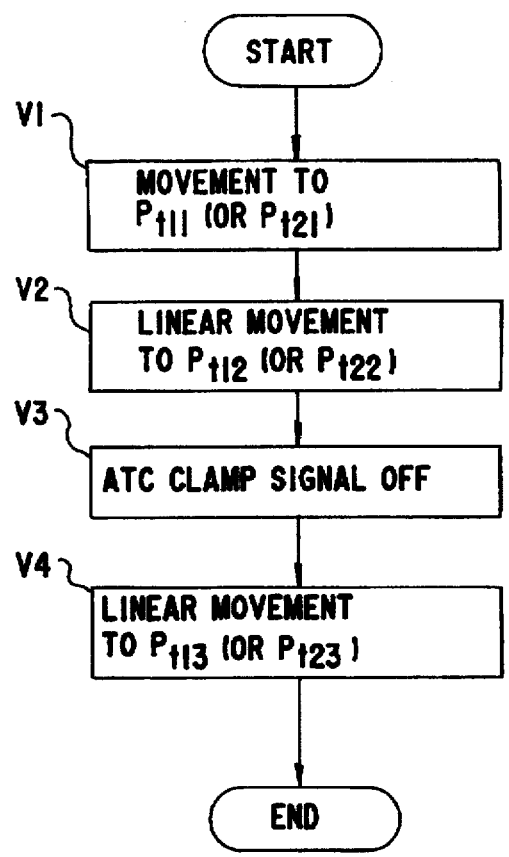
FIG. 14(a) is a flow chart of a routine (a) for detaching a tool.
Figure 14B:
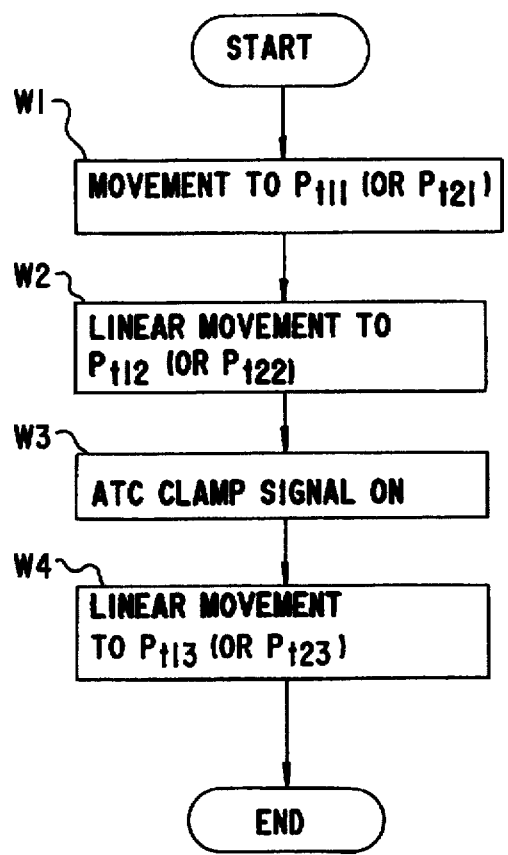
FIG. 14(b) is a flow chart of a routine (b) for mounting a tool.
Figure 18:
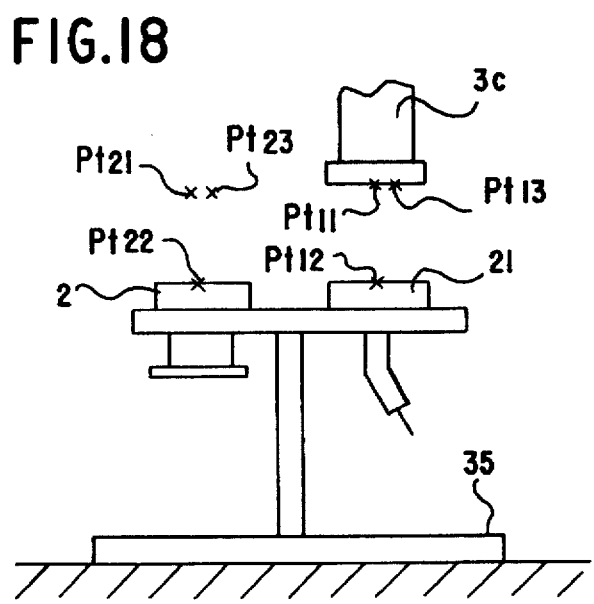

FIG. 14 shows a routine for tool detachment (a) and a routine for tool mounting (b). The tool replacement is performed in such a way that the arm end (wrist) 3c of the robot 4 is moved as shown in FIG. 18 toward a tool stand 35 where the grinder 2 and the welding torch 21 are placed and a new tool is mounted after detaching the presently held tool. The flow chart of FIG. 14 is described in conjunction with FIG. 18.

V1 to V4: For detaching the tool 1 (welding torch 21), the arm 3c is linearly moved to a position $P_{t12}$ after moving to a position $P_{t11}$ and then an ATC clamp signal is turned off to allow the tool 1 to be held by the tool stand 35. Then, the arm 3c is linearly moved to a position $P_{t13}$. Similarly, for detaching the tool 2 (grinder 2), the arm 3c is linearly moved to a position $P_{t22}$ after moving to a position $P_{t21}$ and then the ATC clamp signal is turned off to allow the tool 2 to be held by the tool stand 35. Thereafter, the arm 3c is linearly moved to a position $P_{t23}$.

W1 to W4: For mounting the tool 1 (welding torch 21), the arm 3c is linearly moved to the position $P_{t12}$ after moving to the position $P_{t11}$ and then, the ATC clamp signal is turned on to allow the arm 3c to grasp the tool 1 stored in the tool stand 35. After that, the arm 3c is linearly moved to the position $P_{t13}$. Similarly, for mounting the tool 2 (grinder 2), the arm 3c is linearly moved to the position $P_{t22}$ after moving to the position $P_{t21}$. Sequentially, the ATC clamp signal is turned on to allow the arm 3c to grasp the tool 2 stored in the tool stand 35 and then, the arm 3c is linearly moved to the position $P_{t23}$.

By use of the multi-operation robot system according to the second embodiment, data can be shared between the adaptive control of welding operation and the adaptive control of grinding operation. This enables the position control of the grinder with respect to a direction perpendicular to the grinding line (i.e., a direction transverse to the traveling direction of the grinder) on the grinding plane, such control being principally impossible with information obtained in grinding operation and the adaptive control for grinding. Accordingly, in the robot control system of the second embodiment, the adaptive control for one operation and the adaptive control for the other operation advantageously complement each other, which makes it possible to perform control that is impossible in a single operation. In addition, high efficiency can be achieved without use of a large-scaled control system when successively carrying out different types of operations with a single robot.

While the invention has been particularly described with a case where grinding operation is carried out sequentially after welding operation in the foregoing embodiment, the invention is not limited to such a case but applicable to other cases where correction of the path of a robot arm is required in a series of operations, such as when an operation for inspecting defects in a weld part (e.g., ultrasonic inspection) is sequentially carried out after welding.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A robot control system for controlling a robot which carries a grinding tool to grind the surface of a workpiece, the control system comprising:

(a) load current detecting means for detecting a load current supplied to the grinding tool;

(b) load current change detecting means for detecting the amount of a change in the load current supplied to the grinding tool;

(c) piercing amount controlling means for controlling the amount of piercing into the workpiece by the grinding tool according to the load current detected by the load current detecting means;

(d) grinding speed controlling means for controlling the grinding speed of the grinding tool according to the load current detected by the load current detecting means; and (e) switching means for switching from the piercing amount controlling means to the grinding speed controlling means or vice versa such that when the amount of a change in the load current detected by the load current change detecting means is not more than a specified threshold value, the piercing amount controlling means executes its control and such that when the amount of a change in the load current detected by the load current change detecting means is more than the specified threshold value, the grinding speed controlling means executes its control.

2. A robot control system according to claim 1, wherein the piercing amount controlling means performs control such that when the load current is high, the piercing amount becomes small and when the load current is low, the piercing amount becomes large, and wherein the grinding speed controlling means performs control such that when the load current is high, the grinding speed becomes low and when the load current is low, the grinding speed becomes high.

* * * * *